United States Patent [19]

Kosarzecki

[11] Patent Number: 4,653,527
[45] Date of Patent: Mar. 31, 1987

[54] PRESSURE RELIEF VALVE

[75] Inventor: Constantine Kosarzecki, Inverness, Ill.

[73] Assignee: Modular Controls Corporation, Villa Park, Ill.

[21] Appl. No.: 789,338

[22] Filed: Oct. 21, 1985

[51] Int. Cl.[4] .............................................. F16K 3/36
[52] U.S. Cl. .................................. 137/244; 137/494; 137/509; 137/529; 137/454.5
[58] Field of Search ............... 137/509, 529, 244, 494, 137/454.5

[56] References Cited

U.S. PATENT DOCUMENTS

| | | | |
|---|---|---|---|
| 1,971,186 | 8/1934 | Kornas | 251/360 X |
| 2,642,892 | 6/1953 | Simons | 137/529 |
| 2,897,836 | 8/1959 | Dinning et al. | 137/454.5 |
| 3,217,742 | 11/1965 | Merrill | 137/509 |
| 3,529,624 | 9/1970 | Cryder | 137/509 X |
| 3,886,969 | 6/1975 | Shira | 137/509 |

FOREIGN PATENT DOCUMENTS 437327  10/1935  United Kingdom ............... 137/509

Primary Examiner—Harold W. Weakley
Attorney, Agent, or Firm—Trexler, Bushnell & Wolters, Ltd.

[57] ABSTRACT

A pressure relief valve is disclosed. The pressure relief valve comprises a valve housing including fluid passageways, a poppet valve disposed within the housing, a piston disposed within the housing, and spring means disposed intermediate the piston and the poppet valve for biasly urging apart the piston and the poppet valve. The poppet valve has a valve seat which, together with a portion of the housing, defines a variable valve area. The piston has a piston area, relatively greater than the variable valve area, for modulating flow through, and pressure drop across, the poppet valve. The pressure relief valve preferably includes an orifice disposed within the housing for selectively controlling flow of hydraulic fluid through the housing passageways to the piston. The housing preferably includes an elongated cage within which the poppet valve is longitudinally slidable.

7 Claims, 9 Drawing Figures

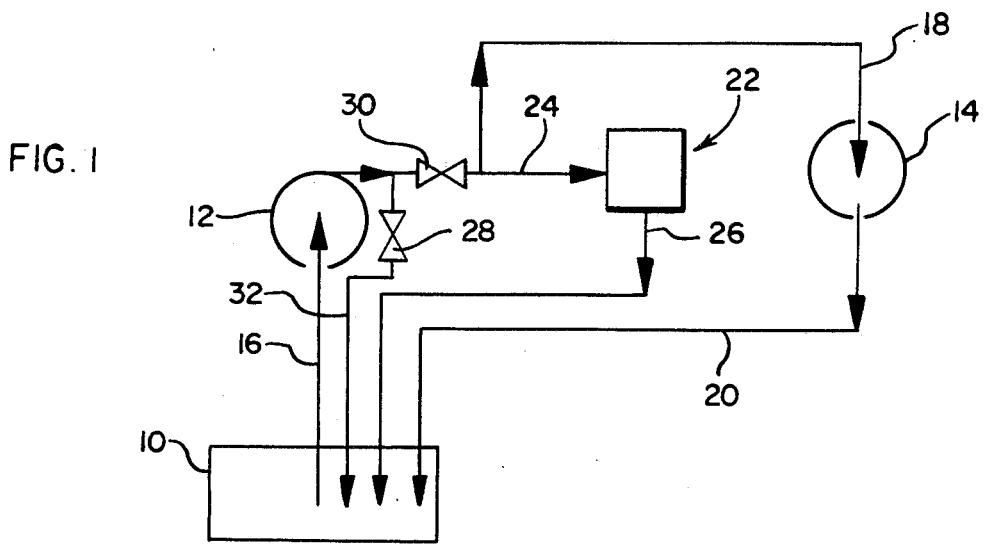
FIG. 1
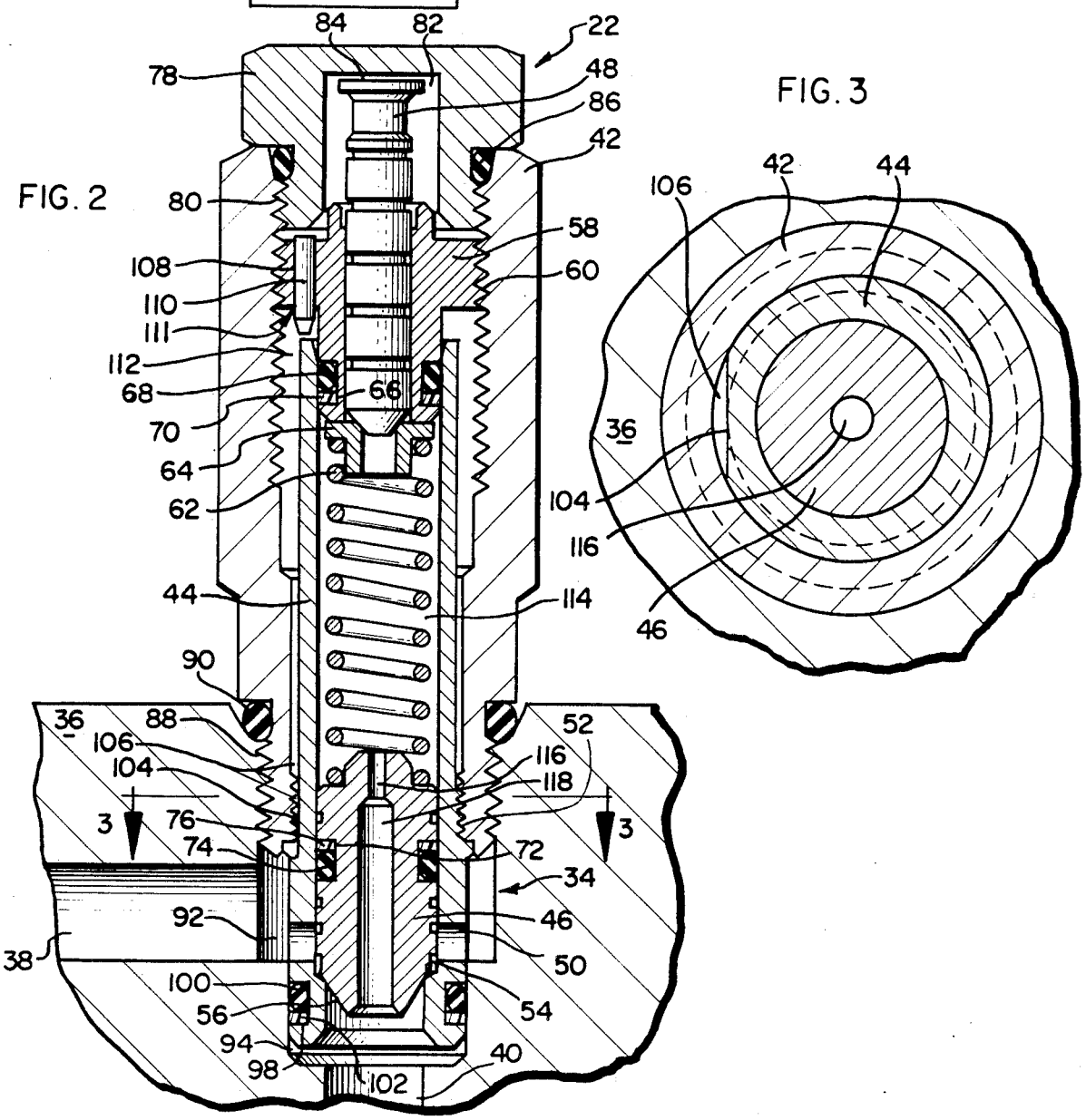
FIG. 2
FIG. 3

4,653,527

1

PRESSURE RELIEF VALVE

BACKGROUND OF THE INVENTION

This invention is directed to a novel pressure relief valve. More particularly, this invention is directed to a novel pressure relief valve which can specifically be used for modulating or substantially eliminating shock effects of acceleration.

It is often desirable in certain hydraulic systems to install a pressure relief valve between a high-pressure hydraulic oil source and a hydraulic oil user so as to protect the user from the effects of a shock or instantaneous pulse of high pressure oil. It is further desirable, from the standpoint of simplicity of operation of the system, that such a relief valve be self-modulating.

OBJECTS AND SUMMARY OF THE INVENTION

It is therefore a general object of this invention to provide a novel and improved pressure relief valve.

A further object is to provide such a pressure relief valve which can be connected in parallel with a hydraulic oil user between a high-pressure hydraulic oil source and a hydraulic oil tank or reservoir.

A more specific object is to provide such a pressure relief valve which is self-modulating whereby such valve, upon being subjected to a relatively high-pressure pulse of hydraulic oil, can automatically gradually build up pressure to the user resulting in gradual acceleration thereof.

Yet another object is to provide such a pressure relief valve which is relatively compact and which takes up relatively little surface area.

Briefly, and in accordance with the foregoing objects, a pressure relief valve according to the invention comprises a valve housing including fluid passageways, a poppet valve disposed within the housing, a piston disposed within the housing, and spring means disposed intermediate the piston and the poppet valve for biasly urging apart the piston and the poppet valve. The poppet valve has a valve seat which, together with a portion of the housing, defines a variable valve area. The piston has a piston area, relatively greater than the variable valve area, for modulating flow through, and pressure drop across, the poppet valve. The relief valve preferably includes an orifice, disposed within the housing, for selectively controlling flow of hydraulic fluid through the housing passageways to the piston. The housing preferably includes an elongated cage within which the poppet valve is longitudinally slidable.

BRIEF DESCRIPTION OF THE DRAWINGS

The foregoing, as well as other objects, features or advantages of the present invention will become more readily understood upon reading the following detailed description of the illustrated embodiment, together with reference to the drawings, wherein:

FIG. 1 is a schematic drawing of the present invention in combination with a hydraulic oil pump, user and reservoir;

FIG. 2 is a side view, in section, of a preferred embodiment of the present invention showing a pressure relief valve comprising a cage, a poppet, a piston and a spring;

2

Figure 5:
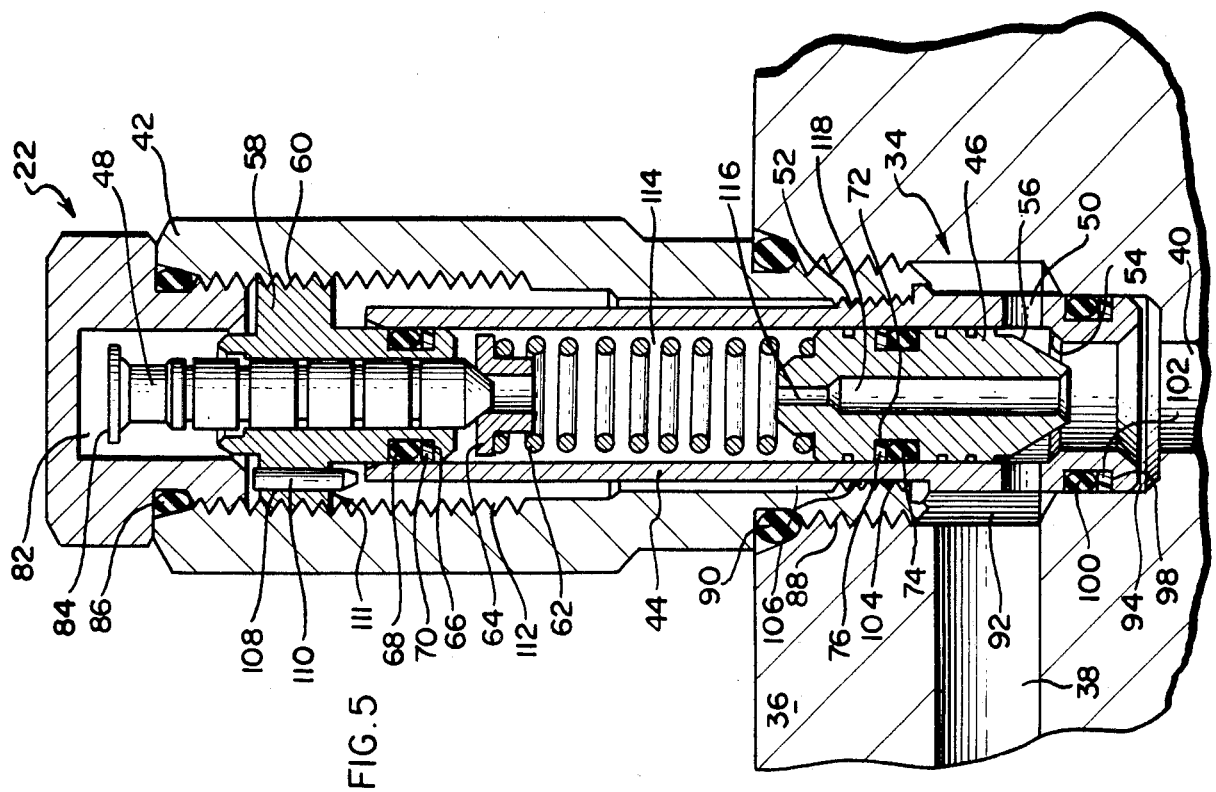
Figure 4:
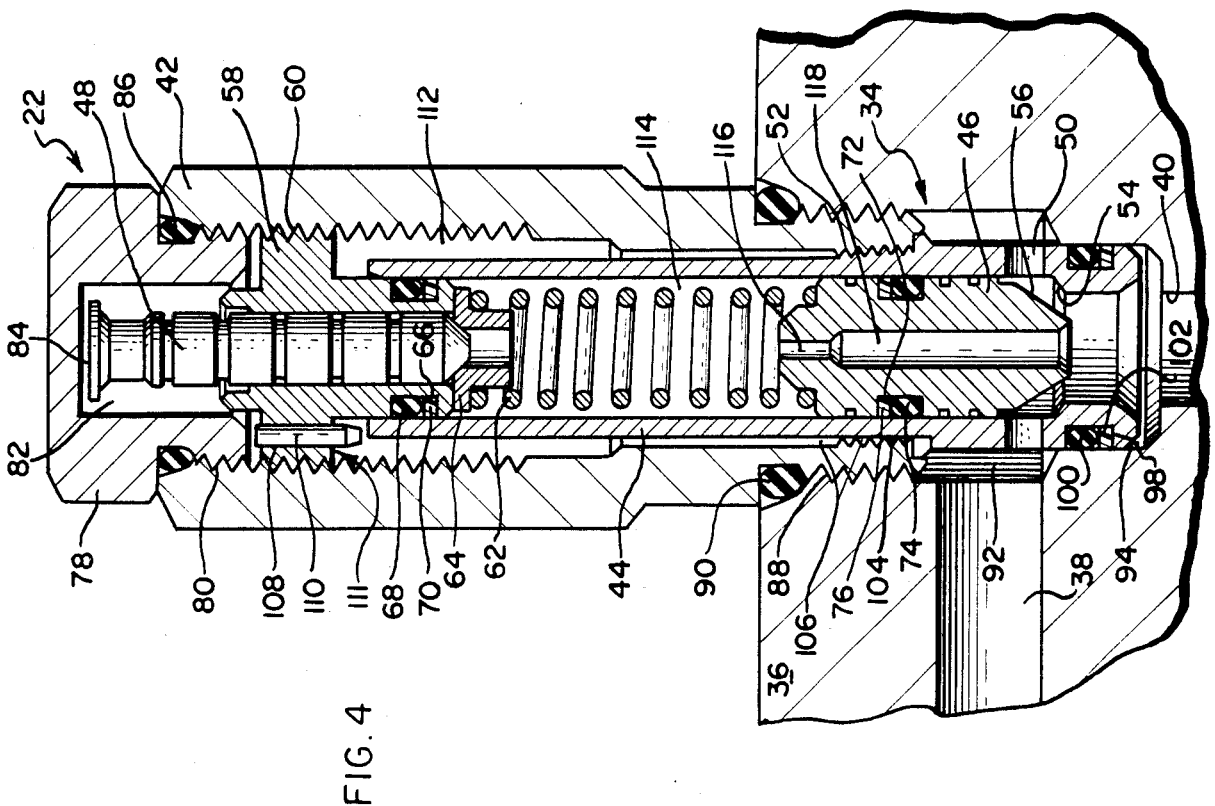
Figure 6:
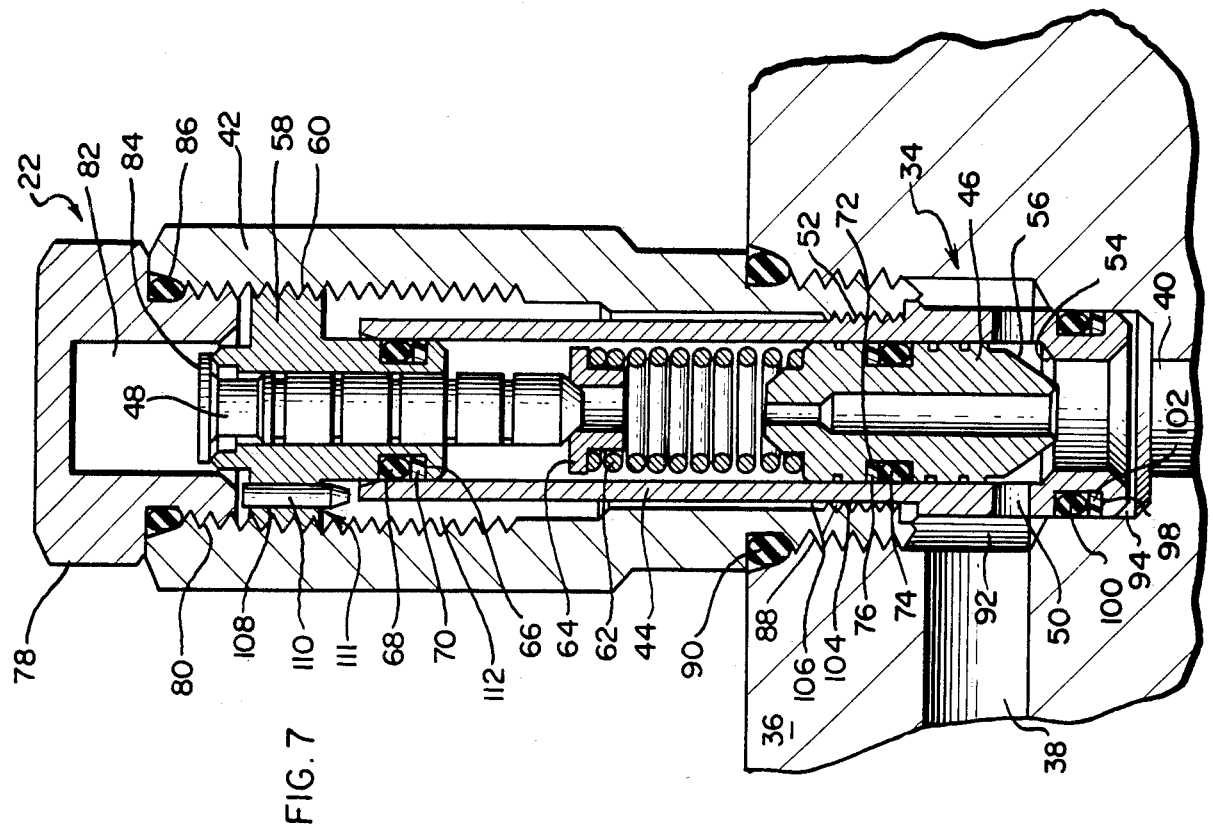
Figure 7:
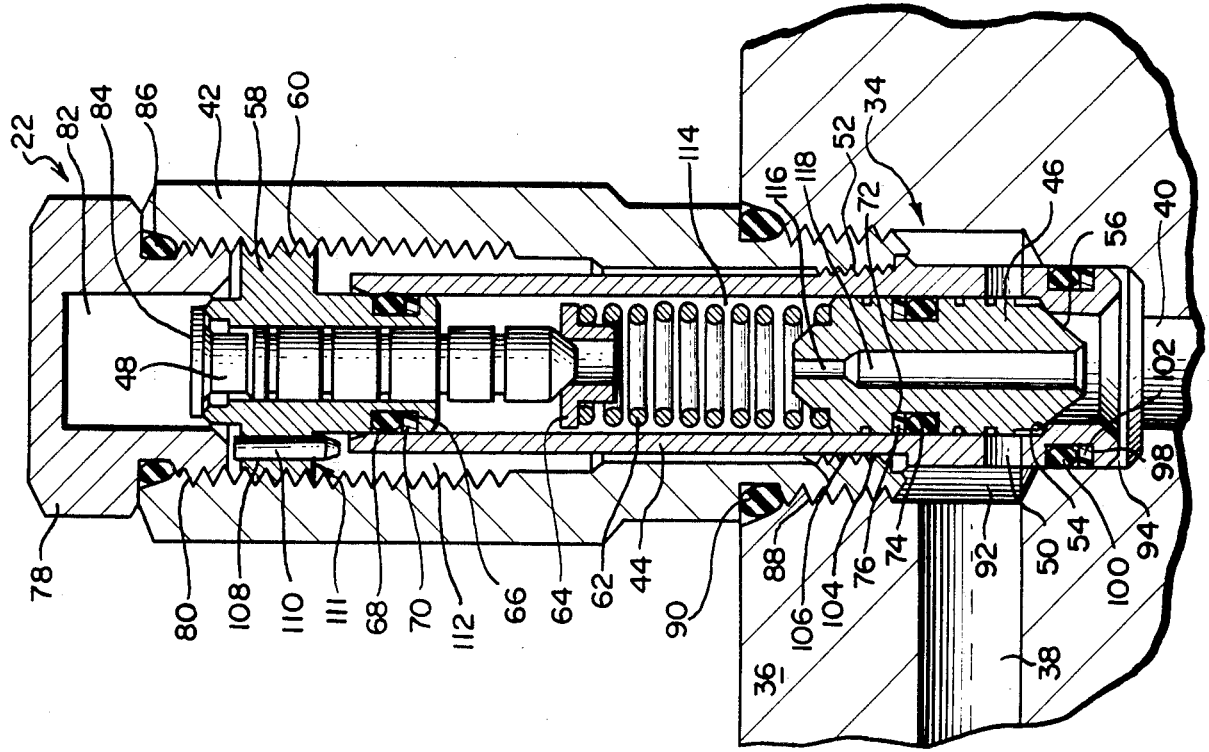
Figure 9:
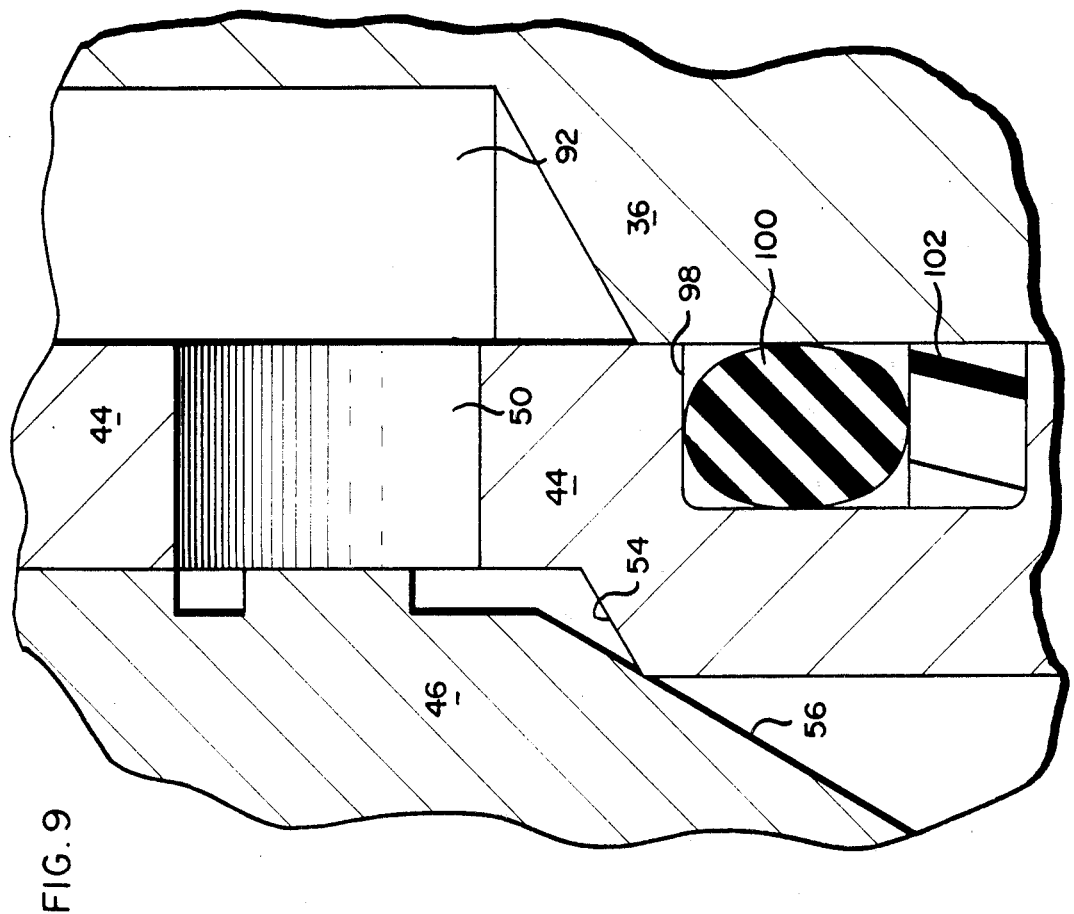
Figure 8:
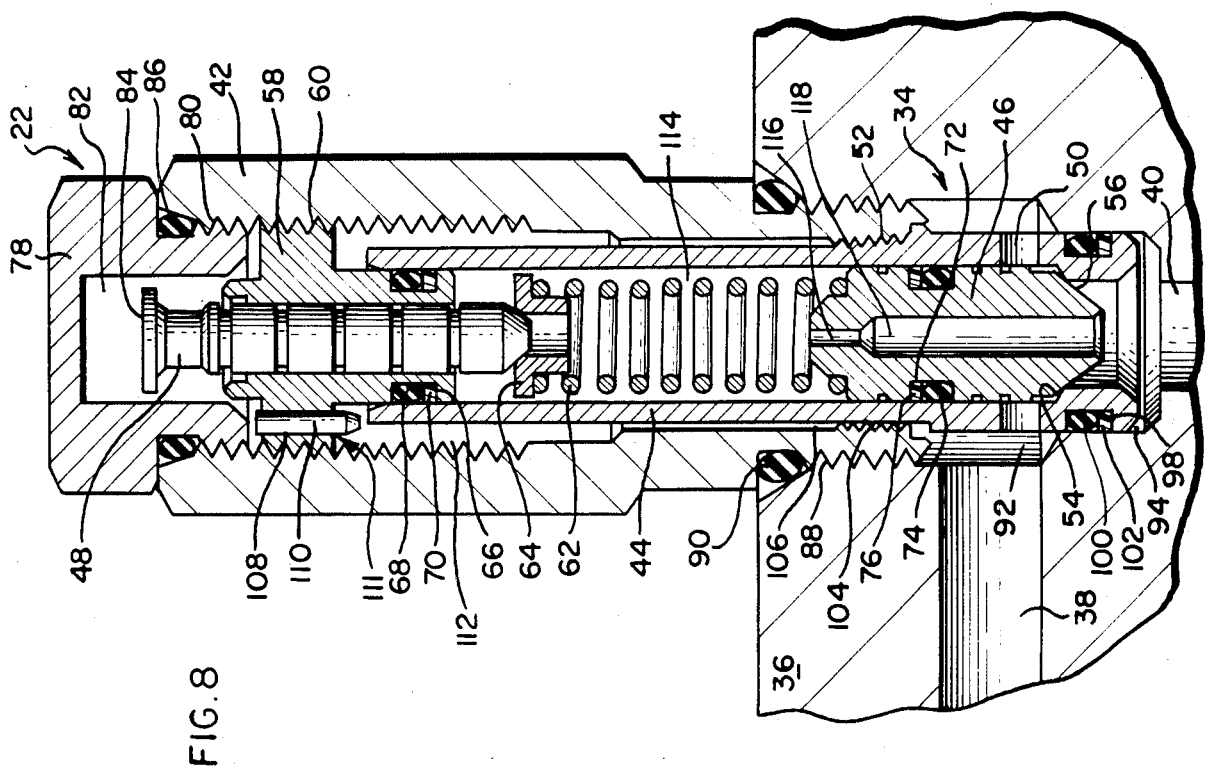

FIG. 3 is a top view, in section and on an enlarged scale relative to FIG. 2, taken from the plane 3—3 of FIG. 2;

FIG. 4 is a side view, in section, similar to the view of FIG. 2 but with the poppet having been moved upwardly relative to the cage;

FIG. 5 is a side view, in section, similar to the view of FIG. 4 but with the piston having been moved downwardly relative to the cage;

FIG. 6 is a side view, in section, similar to the view of FIG. 2, but with the piston being shown as having bottomed out against an adjusting screw, the bottoming out of the piston having caused the poppet to be urged fully downwardly within the cage;

FIG. 7 is a side view, in section, similar to the view of FIG. 6 but with additional fluid pressure having caused the poppet to move upwardly within the cage;

FIG. 8 is a side view, in section, presenting a steady state (or drive) mode of the pressure relief valve; and FIG. 9 is a detail view, in section and on an enlarged view relative to FIGS. 2–8, presenting the differential valve area between the poppet and cage.

DETAILED DESCRIPTION OF THE ILLUSTRATED EMBODIMENT

Fluid, preferably hydraulic oil, from a tank or reservoir 10 is supplied by a pump 12 to a user 14 (FIG. 1). The user 14 can, for example, be a hydraulic motor or a transmission, coupled to a drive wheel of a wheeled vehicle. The pump 12 can preferably deliver such fluid at up to 3000 psi (pounds per square-inch) and is therefore a relatively high-pressure fluid source.

The fluid is transferred from the tank 10 to the pump 12 via a conduit 16, thereafter is transferred from the pump 12 to the user 14 via a conduit 18, and still thereafter is returned to the tank 10 (from the user 14) via a conduit 20.

The pressure relief valve 22 of the present invention (FIGS. 1, 2, 4–8) is connected in parallel with the user 14 via a conduit 24. Fluid from the relief valve 22 returns to the tank 10 via a conduit 26 (FIG. 1). Until such fluid is transferred to the user 14, a first valve 28 is usually kept open and a second valve 30 is usually kept closed, thereby resulting in flow of such fluid only through the conduit 16, the pump 12 and a fluid-return conduit 32.

It can be appreciated that when the valve 30 is rapidly opened and the valve 28 rapidly closed, the user 14 and relief valve 22 can rapidly become subjected to a shock (or so-called instantaneous) pulse of relatively high-pressure fluid.

The pump 12, as herein described in combination with the pressure relief valve 22, is preferably designed to continuously operate at pressures approaching 2000 psi. Such a pump, in accordance with certain pump-design criteria, at times may even be able to supply 3000 psi. (Throughout this application the term psi will be understood to mean gauge pressure, i.e., pressure in addition to atmospheric pressure.)

. With the pump 12 operating at a relatively high fluid pressure, and after the valves 28, 30 have been adjusted as above described, thereby subjecting the user 14 to an instantaneous or shock pulse of relatively high-pressure fluid, the relief valve 22 operates in a manner (described in greater detail below) so as to gradually accelerate the user 14, thereby substantially eliminating effects to the user 14 of such a high-pressure fluid pulse.

The pressure relief valve 22 has preferably been used to drive hydraulic motors of wheeled vehicles where controlled acceleration of such vehicles is desired. The pressure relief valve 22 has been shown to be particularly useful where there is successive acceleration, such as, for example, during the shifting of gears. The pressure relief valve 22 can also be used on manlifts, for reasons outlined above.

The pressure relief valve 22 is preferably screwed into a bore 34 of a valve block or manifold 36 (FIGS. 2, 4–8). Communicating with the bore 34 (in the manifold 36) are first (or horizontal) and second (or vertical) fluid passageways 38, 40. At least one of the fluid passageways 38, 40 (preferably the first passageway 38) is in fluid communication with the conduit 24 (FIG. 1). The other of the fluid passageways 38, 40 (preferably the second passageway 40) is in fluid communication with the conduit 26.

The pressure relief valve 22 preferably includes an elongated, hollow retainer (or housing) 42, and an elongated, hollow cage (or cartridge) 44 longitudinally disposed within the retainer 42. The retainer 42 and cage 44 are both preferably circular in transverse cross section (FIG. 3). The pressure relief valve 22 further preferably includes, longitudinally disposed within the cage 44, a relatively elongated, hollow poppet valve 46 and an elongated piston 48, partially longitudinally extending from the cage 44, which is biasly engaged with the poppet valve 46.

The cage 44 preferably includes six circumferentially-spaced, radially-disposed through bores 50 for permitting fluid to flow from the first fluid passageway 38 into the cage 44.

The cage 44 is preferably screwed into the retainer 42 along meshing threads 52 which are respectively common to internal and external surface portions of the retainer 42 and cage 44 (FIGS. 2, 4–8). The poppet valve 46, also preferably circular in transverse cross section (FIG. 3), is preferably snugly engageable along external surface portions thereof with internal surface portions of the cage 44. The cage 44 has a tapered seat 54 (FIG. 9) along a bottom or lower portion thereof. In like manner, a bottom or lower portion of the poppet valve 46 has a tapered portion 56, relatively more acute in taper than the seat 54 and longitudinally disposable into the seat 54.

A slightly elongated, hollow adjusting screw 58 is preferably longitudinally screwed into the retainer 42 along meshing threads 60 which are respectively common to internal and external surface portions of the retainer 42 and adjusting screw 58 (FIGS. 2, 4–8). A forward or lower portion of the adjusting screw 58 is preferably longitudinally disposed into an upper portion of the cage 44.

Also longitudinally disposed within the cage 44 intermediate the adjusting screw 58 and the poppet valve 46 are a helical spring 62 and a spring guide 64 which is preferably positioned atop the spring 62. Longitudinally disposed into a longitudinally-disposed and centrally-aligned through bore of the adjusting screw 58, preferably relatively snugly therewithin, is the piston 48. A forward or lower portion of the piston 48, which extends from the adjusting screw 58, engages an upper portion of the spring guide 64. The forward or lower portion of the adjusting screw 58, longitudinally disposed into the cage 44, causes the forward or lower portion of the piston 48, engaging the upper portion of the spring guide 64, to compress the spring 62 further causing the tapered portion 56 of the poppet valve 46 to come into contact with the seat 54 (FIG. 9).

The forward or lower portion of the adjusting screw 58, which is disposed within the cage 44, further preferably includes an external circumferential groove or slot 66 within which an elastomeric O-ring 68 and a backup washer 70 are engaged (FIGS. 2, 4–8). The O-ring 68 biasly engages the cage 44 for substantially isolating fluid passageways (not shown) intermediate the cage 44 and adjusting screw 58, which are immediately above the O-ring 68, from similar fluid passageways (also not shown) immediately below the O-ring 68. The washer 70 serves to snugly locate the O-ring 68 within the groove or slot 66. The poppet valve 46 similarly includes an external, circumferential groove or slot 72 within which an elastomeric O-ring 74 and backup washer 76 are engaged, for substantially isolating fluid passageways (not shown) intermediate the cage 44 and poppet valve 46, which are immediately above the O-ring 74 from similar fluid passageways (also not shown) immediately below the O-ring 74.

A hollow cap 78 is preferably longitudinally screwed into the retainer 42 atop the piston 48, also meshing threads 80 which are respectively common to internal and external surface portions of the retainer 42 and the cap 78. The cap 78, moreover, preferably provides a piston cavity (or chamber) 82 around an upper portion of the piston 48 and otherwise substantially surrounds a head 84 of the piston 48 (FIGS. 2, 4–8).

Co-action between the tapered seat 54 and poppet valve tapered portion 56 define a differential area (FIG. 9) for the poppet valve 46. The piston head 84 has an upper surface which provides the head 84 with substantially more surface area than is provided by the differential area. It will be appreciated, when the poppet valve 46 is seated in the cage seat 54 (FIG. 9), that the differential area is thereby caused to assume a minimal area value. It will further be appreciated, moreover, when the poppet valve 46 is vertically spaced from the seat 54 (FIGS. 4, 5 and 7), that the differential area is accordingly thereby caused to assume an area value which is relatively greater than the minimal value. The piston head 84 has a surface area which is preferably 110% of a maximum area value of the differential area.

An elastomeric O-ring 86 is preferably circumferentially engaged atop the threads 80 intermediate the cap 78 and the retainer 42 for substantially eliminating leakage of fluid from the pressure relief valve 22.

The retainer 42 is preferably screwed into the manifold 36 along meshing threads 88 which are respectively common to internal and external surface portions of the manifold 36 and retainer 42. An elastomeric O-ring 90, circumferentially carried by the retainer 42 and engaging an upper surface of the threads 88, is preferably engaged intermediate the retainer 42 and the manifold 36 for substantially eliminating leakage of the fluid from the bore 34.

The bore 34 preferably includes first and second co-axially concentric steps 92, 94 (both of which are preferably circular in transverse cross section) of progressively decreasing diameter. The first fluid passageway 38 communicates with the first step 92. The second fluid passageway 40 communicates with the second step 94. The first step 92 surrounds a lower portion of the cage 44. A still lower portion of the cage 44 preferably snugly fits into the second step 94.

The bottom or lower portion of the cage 44, which fits into the second step 94, moreover, preferably includes an external, circumferential slot or groove 98 within which an elastomeric O-ring 100 and a backup washer 102 are engaged. The O-ring 100 snugly circumferentially engages the inner periphery of the second step 94 for substantially preventing fluid leakage around the pressure relief valve 22, which would otherwise result in uncontrolled fluid flow between the first and second fluid passageways 38, 40.

A lateral external portion 104 (FIG. 3) of the cage 44 has preferably been ground flat thereby providing a third fluid passageway 106 between the retainer 42 and the cage 44 (FIGS. 2, 4-8). The third fluid passageway 106 communicates with the first fluid passageway 38 via the first step 92.

The adjusting screw 58 further includes, within an annular shoulder portion thereof, a second longitudinally-disposed through bore 108, located preferably parallel to the above mentioned through bore within which the piston 48 slides. The bore 108 is preferably circular in transverse cross section. A dowel pin 110, having an external diameter relatively smaller than the diameter of the bore 108, is longitudinally disposed within the bore 108, whereby the bore 108 and pin 110 co-act to form an annular orifice 111.

The pin 110 is free to move vertically relative to the bore 108 between first and second limits. The first (or upper) limit is reached when an upper surface of the pin 110 engages a lower surface portion of the cap 78. The second (or lower) limit is reached when a lower surface of the pin 110 engages an upper surface portion of the cage 44 (FIGS. 2, 4-8).

It will be appreciated, moreover, because the orifice 111 is essentially annular, that the likelihood of a particle or a series of particles of fluid debris plugging the orifice 111 is substantially less likely than in the case of a typically cylindrical orifice. It will also be appreciated, because the pin 110 is free to move vertically relative to the bore 108, that the pin 110 and bore 108 thus co-act to render the orifice 111 with an essentially "self cleaning" feature.

A fourth fluid passageway 112, intermediate the retainer 42 and the cage 44, communicates via the third fluid passageway 106 with the first fluid passageway 38, and communicates via the bore 108 with the piston cavity 82.

The cavity 82 can be caused to fill with hydraulic fluid in a predetermined time (preferably from about 100 milliseconds to about 10 seconds) by altering relative diameters of the bore 108 and pin 110 so as to affect rate of fluid flow through the orifice 111, or by altering certain other features of the pressure relief valve 22, which will now be discussed. For example, at a first set of conditions, a sufficiently stiff spring 62 has been designed whereby the pressure relief valve 22 has operated within a pressure range of from about 150 to about 700 psi. In one application employing the 150-700 psi pressure range, it was desirable to size the relative diameters of the bore 108 and pin 110 such that the cavity 82 filled with hydraulic fluid causing the piston 48 to move from a minimum pressure condition, relative to the spring 62 (FIG. 2), to a maximum (or bottomed out) pressure condition (FIG. 6) in about 1 second. This means that in such application, when fluid pressure in the first fluid passageway 38 was caused to pulse or jump from a steady-state pressure to a relatively greater pressure in excess of 700 psi, that about 1 second of time passed before the full effect of the greater fluid pressure was experienced at the second fluid passageway 40.

In another application, a relatively stiffer spring 62 has been designed whereby the pressure relief valve 22 has operated within a pressure range of from about 400 to about 2000 psi. In such second application, the relative diameters of the bore 108 and pin 110 were sized so that the cavity 82 filled with hydraulic fluid causing the piston 48 to move from the minimum pressure (FIG. 2) to the maximum pressure (FIG. 6) condition in about 5 seconds.

The pressure relief valve 22 further includes additional features which are designed to protect the user 14 when the pump 12 delivers fluid at a pressure in excess of the maximum pressure range of the valve 22. When the valve 22, operating for example within the range of about 400 and 2000 psi, is suddenly subjected via the first fluid passageway 38 to a pulse of relatively high-pressure fluid in excess of 2000 psi, the poppet valve 46 is thereby caused relatively quickly to move vertically relative to the cage 44 from the maximum pressure condition (FIG. 6) to a pressure condition in excess of maximum pressure for the valve 22 (FIG. 7). In any event, because of the parallel connections of the valve 22 and user 14 to the pump 12, only the maximum pressure (condition) for the valve 22 is experienced by the user 14. In this example, that fluid pressure is approximately 2000 psi.

The piston 48 preferably has an outer diameter such that the piston 48 snugly longitudinally slides within the adjusting screw 58. It can be appreciated, however, that fluid from the cavity 82 can bypass an annular interface between the piston 48 and the adjusting screw 58 and can accumulate in a spring cavity 114 (FIGS. 2, 4-8) within the cage 44. To prevent a condition referred to in the art as "hydraulic lock", the poppet valve 46 accordingly has communicating first and second longitudinally-disposed through bores 116, 118 which communicate with the second fluid passageway 40 and spring cavity 114. The first and second poppet valve through bores 116, 118 preferably have individual transverse cross sections such that when the second fluid passageway 40 is exhausting fluid (FIGS. 4, 5, 7) to the tank 10 (FIG. 1), fluid pressure within the spring cavity 114 is essentially maintained at atmospheric pressure. More precisely, the hydraulic pressure within the cavity 114 is generally maintained within the range of from about 0 to about 4 psi (preferably maintained within the range of from about 0 to about 1 psi).

The adjusting screw 58 is longitudinally (or vertically) moved relative to the retainer 42 for effecting operation of the pressure relief valve 22 within predetermined minimum and maximum pressure operating conditions.

To adjust the adjusting screw 58, the pressure relief valve 22 is first drained of any fluid which may be contained therewithin. The cap 78 is then removed from the retainer 42, and the piston 48 removed from the adjusting screw 58. The pressure relief valve 22 is next put into a test stand (not shown) and the first and second fluid passageways 38, 40 are respectively connected to appropriate pressurized fluid supply and exhaust ports of a commercially available valve-adjustment apparatus (also not shown).

An upper portion of the adjusting screw 58 has a notch (not shown) transverse to the adjusting screw through bore within which the piston 48 longitudinally slides, whereby a tool, such as a screw driver (not shown), can be used to rotate the adjusting screw 58 relative to the retainer 42, whereby the adjusting screw 58 longitudinally moves upward or downward relative to the retainer 42 along the threads 60. The adjusting screw 58 is accordingly adjusted until the tapered portion 56 of the poppet valve 46 comes into contact with the tapered seat 54 of the cage 44 thereby seating the poppet valve 46 in the cage 44 (FIG. 9) at the minimum pressure value of the predetermined pressure range, which, in turn, is determined by the physical properties of the spring 62.

OPERATION OF THE ILLUSTRATED EMBODIMENT

When the pressure relief valve 22 is placed into service, fluid from the first passageway 38 fills the cavity 82. When the fluid pressure in the first fluid passageway 38 is less than a predetermined minimum pressure value, the tapered portion 56 of the poppet valve 46 is seated against the seat 54 of the cage 44 (FIG. 9) and the piston 48 is fully upwardly extended within the cavity 82 (FIG. 2). When the fluid pressure is at or above the predetermined minimum pressure value, the poppet valve 46 moves upward relative to the cage 44 thereby permitting fluid to flow from the first fluid passageway 38, through the first step 92, past the seat 54, and to be exhausted from the pressure relief valve 22 via the second fluid passageway 40 (FIG. 4). Such upward action of the poppet valve 46 relative to the cage 44 compresses the spring 62 slightly.

Fluid entering the pressure relief valve 22 via the first fluid passageway 38 flows via the third fluid passageway 106 across the lateral external (or "flat") portion 104 (FIG. 3) of the cage 44, and communicates via the fluid passageway 112 with the orifice 111.

At the predetermined minimum pressure value, the piston 48 is fully upwardly extended in the cavity 82 relative to the adjusting screw 58 (FIG. 4). At the predetermined maximum pressure value, the piston 48 is caused to bottom out against the adjusting screw 58 and the resultant compression of the spring 62 causes the poppet valve 46 to be seated against the seat 54 of the cage 44 (FIG. 6).

It will be appreciated that movement of the piston 48, relative to the adjusting screw 58, from a first position where the piston head 84 is substantially maximally extended above an upper annular shoulder of the adjusting screw 58 (FIG. 4) to a second position where the piston head 84 is engaging (or has "bottomed out") against the adjusting screw annular shoulder (FIGS. 6, 7), affects the volume of the cavity 82. As the cavity 82 is filling with fluid, and as the piston 48 is thereby caused to move downwardly relative to the adjusting screw 58 further thereby causing the spring 62 to become compressed, the fluid exhaust pressure of the pressure relief valve 22 at the second fluid passageway 40 accordingly progressively increases.

When the pressure relief valve 22 is connected in parallel with a user 14 as above described (FIG. 1), a shock-start of the pump 12, whereby the pump 12 is caused to supply fluid between the predetermined minimum and maximum pressure values, does not therefore result in a like shock-start of the user 14. Rather, because of the operation of the pressure relief valve 22, the gradually increasing back pressure at the second fluid passageway 40 and conduit 26 results in a gradual start (or acceleration) of the user 14 (FIG. 1).

Some time after the shock-start of the pump 12, when the flow of fluid through the user 14 has approached a so-called steady-state condition, and while the fluid pressure within the cavity 82 is between the predetermined minimum and maximum pressure values (for the pressure relief valve 22, this is referred to as being in the "drive" mode), co-action of the piston 48 with the spring 62 causes the poppet valve 46 to be seated against the seat 54 of the cage 44 (FIG. 8) whereby substantially full fluid pressure being delivered by the pump 12 is experienced at the user 14 (FIG. 1). In the drive mode, substantially no fluid is exhausted from the pressure relief valve 22 via the conduit 26 to the tank 10. Rather, substantially full flow of fluid from the pump 12 is directed through the user 14.

While the pressure relief valve 22 is operating in the drive mode at an intermediate fluid pressure between the predetermined minimum and maximum pressure values, it can be appreciated, from the above discussion, that a shock-pulse of fluid above the intermediate fluid pressure will cause the pressure relief valve 22 to function as above described to gradually accelerate the user 14.

Occasionally, the pump 12 may supply fluid at a pressure which is above the predetermined maximum pressure value designed for the pressure relief valve 22, and the pressure relief valve 22 accordingly includes additional features which permit certain elements of the valve 22 to co-act in a manner so as to protect the user 14. At a shock-start of the pump 12 or for a shock-pulse (often referred to in the art as a "step change") of relatively high-pressure fluid into the conduits 18, 24 (FIG. 1), the cavity 82 (FIGS. 2, 4–8) will fill with fluid in a predetermined time (as above discussed) causing the piston 48 to be moved from the first or uppermost position (FIG. 2) to the second or bottomed out position (FIGS. 6, 7). The bottomed out position normally causes the poppet valve 46 to become seated against the seat 54 of the cage 44 (FIGS. 6, 9). However, when hydraulic fluid in the first fluid passageway 38 is in excess of the predetermined maximum pressure value, the poppet valve 46 is caused to move upward in the cage 44 thereby resulting in the exhausting of the fluid from the pressure relief valve 22 via the second fluid passageway 40 at the predetermined maximum pressure value (FIG. 7). With the conduit 26 (FIG. 1) being subjected to the predetermined maximum pressure, the conduit 18 supplying the user 14 is similarly subjected to the predetermined maximum pressure.

As described above, the pressure relief valve 22 is preferably being used for modulating start up (or acceleration) of the user 14. Such a use of the pressure relief valve 22 permits a gradual buildup of fluid pressure in the user 14 thereby resulting in a gradual acceleration of the user 14. The pressure relief valve 22, moreover, automatically functions to provide substantially full flow of fluid to the user 14 while the user 14 approaches the steady-state condition. As the user 14 approaches the steady-state condition or otherwise comes up to desired speed, use of the pressure relief valve 22 accordingly provides for further acceleration of the user 14 such as, for example, when the user 14 is shifted into a subsequent gear.

It can be appreciated, moreover, because substantially all movement of parts within the pressure relief valve 22 is virtually uniformly vertical, relative to the manifold 36, that the pressure relief valve 22 is relatively more compact and requires relatively less surface area than many commercially-available pressure relief valves having similar features.

What has been illustrated and described herein is a novel pressure relief valve. While the pressure relief valve of the present invention has been illustrated and described with reference to a preferred embodiment, the invention is not limited thereto. On the contrary, alternatives, changes or modifications may become apparent to those skilled in the art upon reading the foregoing description. Accordingly, such alternatives, changes and modifications are to be considered as forming a part of the invention insofar as they fall within the spirit and scope of the appended claims.

I claim:

1. A cartridge pressure relief valve for controlling the flow of fluid between first passageway means and second passageway means in a manifold comprising: valve housing means including a retainer body adapted to be threaded into the manifold and a tubular cage secured within said body and having an inlet and an outlet for respectively communicating with said first passageway means and said second passageway means, tapered annular integral valve seat means disposed within said cage intermediate said inlet and said outlet, a poppet valve having a tapered valve surface slidable within said cage and engageable with said seat means for controlling flow of fluid from said first passageway means to the second passageway means, the taper of said seat means being relatively more acute than the taper of said poppet valve surface thereby defining therebetween a variable valve seat area having a maximum area value and a minimum area value for thereby variably effecting pressure drop of the fluid from a first fluid pressure at said inlet to a relatively lesser fluid pressure at said outlet; spring means engaging said poppet valve within said cage for biasing said poppet valve toward said seat means, said housing means including an internal chamber communicating with said inlet; piston means disposed within said chamber for biasing said spring means toward said poppet valve in response to fluid pressure in said chamber, said piston means having an effective surface area relatively greater in dimension than the maximum area value of said variable valve seat area; and adjustable stop means within said chamber for adjustably limiting movement of the piston means toward said spring means and thereby adjusting the action of the spring means biasing the poppet valve toward said seat means.

2. The pressure relief valve of claim 1 wherein said adjustable stop means comprises an adjusting screw disposed within and axially adjustable relative to said housing means and including a wall separating said chamber from said inlet, said wall including an axial bore slidably receiving said piston means and a second bore communicating with said chamber and said inlet, said piston means including an enlarged head engageable with said wall for limiting movement of said piston means; and a pin slidably disposed in said second bore, said pin and said second bore defining an annular orifice establishing communication between said chamber and said inlet.

3. The pressure relief valve of claim 1 further including orifice means within said housing means intermediate said chamber and said inlet for controlling flow of fluid from the inlet into said chamber and thus the time to fill the chamber with fluid, said orifice means comprising a wall disposed within said housing means separating said chamber from said inlet, said wall including a through bore communicating with said chamber and said inlet; and a pin axially freely slidably disposed in said last mentioned bore, said pin and said last mentioned bore defining an annular orifice.

4. The pressure relief valve of claim 1 wherein said piston surface area is about 110% of said maximum area value of said variable valve seat area.

5. The pressure relief valve of claim 4 wherein said time to fill said chamber ranges from about 100 milliseconds to about 10 seconds.

6. The pressure relief valve of claim 4 wherein said time to fill said chamber is about 1 second when said first and second predetermined fluid pressures are about 700 and about 150 psi respectively.

7. The pressure relief valve of claim 4 wherein said time to fill said chamber is about 5 seconds when said first and second predetermined fluid pressures are about 2000 and 400 psi respectively.

* * * * *